(12) United States Patent
Wu et al.

(10) Patent No.: US 10,484,468 B2
(45) Date of Patent: Nov. 19, 2019

(54) METHOD AND DEVICE FOR DOWNLOADING FILE

(71) Applicant: Tencent Technology (Shenzhen) Company Limited, Guangdong (CN)

(72) Inventors: Haijun Wu, Guangdong (CN); Rui Li, Guangdong (CN); Yongqiang Zou, Guangdong (CN); Shengyu Dong, Guangdong (CN); Taifu Que, Guangdong (CN); Lei Wang, Guangdong (CN); Shaopeng Yang, Guangdong (CN); Shuxin Zhang, Guangdong (CN); Dayong Zhao, Guangdong (CN); Chang Liu, Guangdong (CN); Xiaodong Chen, Guangdong (CN); Yinfeng Zhang, Guangdong (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 719 days.

(21) Appl. No.: 14/624,647

(22) Filed: Feb. 18, 2015

(65) Prior Publication Data
US 2015/0163280 A1 Jun. 11, 2015

Related U.S. Application Data

(63) Continuation of application No. PCT/CN2013/082303, filed on Aug. 26, 2013.

(30) Foreign Application Priority Data

Aug. 28, 2012 (CN) .......................... 2012 1 0309977

(51) Int. Cl.
*H04L 29/08* (2006.01)

(52) U.S. Cl.
CPC ............ *H04L 67/108* (2013.01); *H04L 67/02* (2013.01); *H04L 67/06* (2013.01)

(58) Field of Classification Search
CPC ... H04L 67/1097; H04L 67/06; H04L 67/108; G06F 3/067
(Continued)

(56) References Cited

U.S. PATENT DOCUMENTS 6,192,412 B1 * 2/2001 Cantoral ................. H04L 45/00
370/472
8,307,087 B1 * 11/2012 Patvarczki .......... H04L 67/1097
707/827
(Continued)

FOREIGN PATENT DOCUMENTS

| CN | 101030873 A | 9/2007 |
|---|---|---|
| CN | 101150506 A | 3/2008 |
| CN | 102075561 A | 5/2011 |

OTHER PUBLICATIONS

Office Action issued in corresponding Chinese Application No. 201210309977.2 dated Jul. 21, 2017 with a Concise English Explanation.
(Continued)

*Primary Examiner* — Kevin T Bates
*Assistant Examiner* — Chen-Liang Huang
(74) *Attorney, Agent, or Firm* — Sughrue Mion, PLLC

(57) ABSTRACT

Disclosed are a method and a device for downloading a file. The method includes: when receiving a download request of a file, acquiring attribute information about the file, and learning information about the length of the file according to the attribute information about the file; when the length of the file goes beyond a preset value, segmenting the download request into at least two fragments of download requests; sending the at least two fragments of download requests to at least two data nodes to request to download
(Continued)

corresponding fragments, and obtaining the at least two fragments; and according to the at least two fragments obtained by download, obtaining the file. By segmenting the download request into a plurality of fragments of requests, the present invention achieves the parallel download of the plurality of fragments of requests, thereby greatly improving the download efficiency of a file.

20 Claims, 5 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 2004/0095400 | A1* | 5/2004 | Anderson | G06F 17/30905 715/864 |
| 2005/0083929 | A1 | 4/2005 | Salo et al. | |
| 2007/0043874 | A1 | 2/2007 | Nath | |
| 2008/0016201 | A1* | 1/2008 | Thompson | H04L 47/10 709/223 |
| 2008/0270524 | A1* | 10/2008 | Gupta | G06F 17/30194 709/203 |
| 2009/0273463 | A1* | 11/2009 | Morwood | G08B 25/007 340/514 |
| 2011/0125853 | A1* | 5/2011 | Weber | H04L 12/584 709/206 |
| 2012/0310916 | A1* | 12/2012 | Abadi | G06F 17/30445 707/713 |
| 2013/0332612 | A1* | 12/2013 | Cai | G06F 9/5066 709/226 |
| 2014/0047059 | A1* | 2/2014 | Brownlow | H04L 67/1074 709/213 |

OTHER PUBLICATIONS

International Search Report issued in corresponding International Application No. PCT/CN2013/082303, dated Nov. 14, 2013.

* cited by examiner

METHOD AND DEVICE FOR DOWNLOADING FILE

CROSS REFERENCE TO RELATED APPLICATIONS

The present application is a Continuation Application of PCT Patent Application No. PCT/CN2013/082303, filed on Aug. 26, 2013, which claims the benefit of priority of China Patent Application No. 201210309977.2 filed in the Chinese Patent Office on Aug. 28, 2012, and entitled "METHOD AND DEVICE FOR DOWNLOADING FILE", the content of which is hereby incorporated by reference in its entirety.

FIELD

The disclosure relates to the field of Internet technology, and particularly to a method and a device for downloading a file.

BACKGROUND

With the development of the Internet, HDFS (Hadoop Distributed File System) has emerged. HDFS can be used to segment a file which needs to be stored into 64M of blocks. On the one hand, in order to enhance the security of data, and reduce the risk of data loss, each block of the file may be saved for a plurality of copies, data corresponding to each of the copies is identical, and each of the copies is stored in different DataNode. On the other hand, attribute information of the file can be stored to the NameNode by the HDFS, wherein, the attribute information includes: the size of the file, the number of blocks, and the location of each copies corresponding to each block, etc.

Based on the above-described storage mode of the HDFS, when reading contents of the file, a client of the HDFS firstly obtains a block list of the file from the NameNode and the locations of all the copies corresponding to each block. For a block including a plurality of copies, the client calculates the distances to all the copies of the block, and then sorts the copies according to the distances, such as, from far to near. Then the nearest copy can be selected and downloaded, and if the nearest copy fails to be downloaded, a next copy can be selected and downloaded according to a sorted order, thereby obtaining all the blocks of the file by that analogy.

However, in the process of implementation of the present disclosure, the existing method for downloading file based on the HDFS exists the following problems: because physical distance has smaller role and influence, and network distance changes due to the constantly change of network status, so that the distance between the client and the copies cannot be accurately calculated; moreover, if a DataNode is preferred to be selected by many clients, but the DataNode can only respond to the download of just one client every time, so that other clients can only wait for the downloads, which greatly reduces the download efficiency of a file.

SUMMARY

Embodiments of the present invention provide a method for downloading a file and a device, which are directed to improve the download efficiency of a file. The technical solutions are described in detail as below.

According to a first aspect of the present invention, it is provided a method for downloading a file, including:

when receiving a download request of a file, acquiring attribute information about the file, and learning information about the length of the file according to the attribute information about the file;

when the length of the file goes beyond a preset value, segmenting the download request into at least two fragments of download requests;

sending the at least two fragments of download requests to at least two data nodes to request to download corresponding fragments, and obtaining the at least two fragments; and according to the at least two fragments obtained by download, obtaining the file.

Wherein, the step of segmenting the download request into at least two fragments of download requests, includes:

obtaining a check value of the file according to the attribute information about the file; and segmenting the download request into at least two fragments of download requests according to the check value, wherein, the length of at least one fragment among all the fragments obtained by segmenting the download request is equal to the check value.

The method further including: obtaining a check value of the file according to the attribute information about the file; and wherein, when the length of the file goes beyond a preset value, segmenting the download request into at least two fragments of download requests, includes:

when the length of the file goes beyond a preset value, segmenting the download request into at least two fragments of download requests according to the check value, wherein the lengths of all the fragments obtained by segmenting the download request at least except the last fragment are equal to the check value.

Wherein the preset value is the check value.

Wherein, the step of sending the at least two fragments of download requests to at least two data nodes to request to download corresponding fragments, and obtaining the at least two fragments, includes:

sending the at least two fragments of download requests to at least two data nodes to request to download corresponding fragments; and receiving information returned by each data node, and if the information is a downloaded fragment, storing the downloaded fragment, sending other unprocessed fragments of download requests to the data node to request to download corresponding fragments, and obtaining the at least two fragments.

The method further including:

if the information is download failure information, sending fragments of download request which fail to download fragments to other data nodes except the data node which send the download failure information, to request to download corresponding fragments, and obtaining fragments downloaded from the other data nodes.

After the step of receiving information returned by each data node, the method further including:

if the information is a downloaded fragment, recording information that the fragments are downloaded successfully from current data node, and if the information is download failure information, recording information that the fragments are unable to be downloaded from the current data node.

According to a second aspect of the present invention, it is provided a device for downloading a file, including:

an attribute acquiring module, which is configured to acquire attribute information about a file, when receiving a download request of the file, and learn information about the length of the file according to the attribute information about the file;

a segmenting module, which is configured to segment the download request into at least two fragments of download requests when the length of the file goes beyond a preset value;

a downloading module, which is configured to send the at least two fragments of download requests to at least two data nodes to request to download corresponding fragments, and obtain the at least two fragments; and a file obtaining module, which is configured to obtain the file according to the at least two fragments obtained by download.

Wherein the segmenting module includes:

an obtaining unit, which is configured to obtain a check value of the file according to the attribute information about the file; and a segmenting unit, which is configured to segment the download request into at least two fragments of download requests according to the check value, wherein, the length of at least one fragment among all the fragments obtained by segmenting the download request is equal to the check value.

Wherein the attribute acquiring module is further configured to obtain a check value of the file according to the attribute information about the file; and wherein the segmenting module is configured to:

when the length of the file goes beyond a preset value, segment the download request into at least two fragments of download requests according to the check value, wherein the lengths of all the fragments obtained by segmenting the download request at least except the last fragment are equal to the check value.

Wherein the preset value is the check value.

Wherein the downloading module includes:

a sending unit, which is configured to send the at least two fragments of download requests to at least two data nodes to request to download corresponding fragments; and a receiving unit, which is configured to receive information returned by each data node, and if the information is a downloaded fragment, store the downloaded fragment, send other unprocessed fragments of download requests to the data node to request to download corresponding fragments, and obtain the at least two fragments.

Wherein the receiving unit is further configured to:

if the information is download failure information, send fragments of download request which fail to download fragments to other data nodes except the data node which send the download failure information, to request to download corresponding fragments, and obtain fragments downloaded from the other data nodes.

Wherein the downloading module further includes:

a recording unit, which is configured to record information that the fragments are downloaded successfully from current data node after the receiving unit receiving the information returned by each data node and if the information is a downloaded fragment, and if the information is download failure information, record information that the fragments are unable to be downloaded from the current data node.

Embodiment of the present disclosure may have the following benefit effects: when the download request of the file is received, the attribute information about the file is acquired; and information about the length of the file is learned according to the attribute information about the file; when the length of the file goes beyond a preset value, the download request is segmented into at least two fragments of download requests; the at least two fragments of download requests are sent to at least two data nodes to request to download corresponding fragments, therefore obtaining the at least two fragments; and according to the at least two fragments obtained by download, the file is obtained. By segmenting the download request into a plurality of fragments of requests, a parallel download of the plurality of fragments of requests is achieved, thereby greatly improving the download efficiency of a file.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

The following in conjunction with the accompanying drawings according to various embodiments, clearly describes technical proposals according to various embodiments. It would be obvious that the described embodiments are part but not all of embodiments. All other embodiments obtained by persons having ordinary skills without paying any creative work based on the illustrated embodiments should all be within the protection scope according to various embodiments.

A First Embodiment

Figure 1:
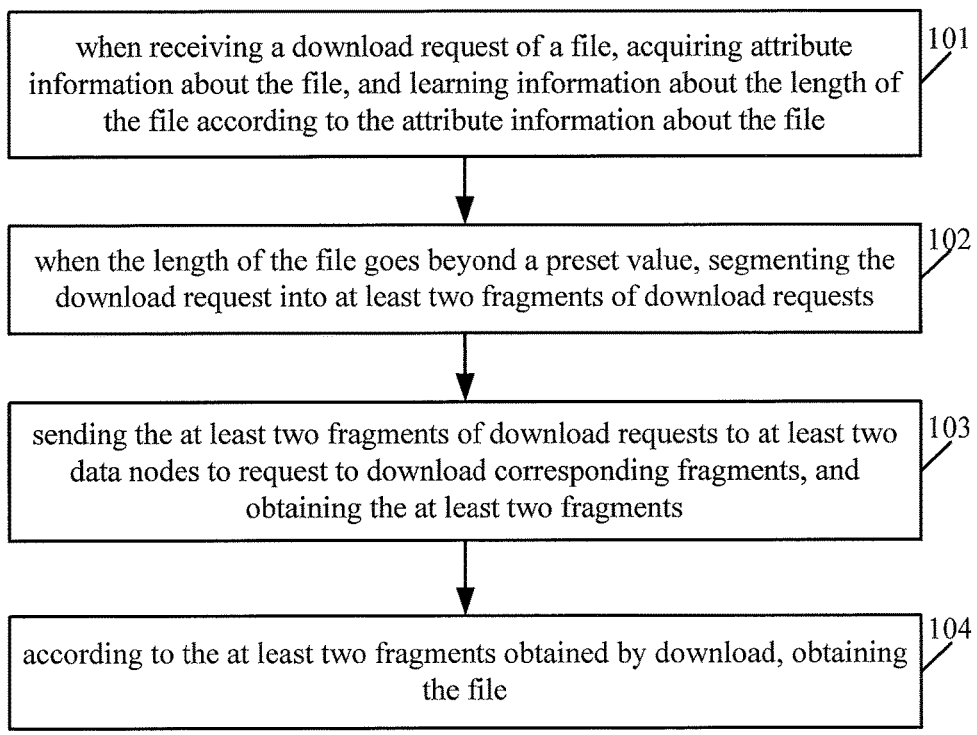
FIG. 1 is a flowchart of a method for downloading a file according to a first embodiment of the present disclosure.

Referring to FIG. 1, it is a flowchart of a method for downloading a file according to a first embodiment of the present disclosure, the method including the following steps.

Step 101: when receiving a download request of a file, acquiring attribute information about the file, and learning information about the length of the file according to the attribute information about the file.

Step 102: when the length of the file goes beyond a preset value, segmenting the download request into at least two fragments of download requests.

Step 103: sending the at least two fragments of download requests to at least two data nodes to request to download corresponding fragments, and obtaining the at least two fragments.

Step 104: according to the at least two fragments obtained by download, obtaining the file.

Preferably, wherein, segmenting the download request into at least two fragments of download requests, includes:

obtaining a check value of the file according to the attribute information about the file; and segmenting the download request into at least two fragments of download requests according to the check value, wherein, the length of at least one fragment among all the fragments obtained by segmenting the download request is equal to the check value. For example, when the length of the file goes beyond a preset value, the download request can be segmented into three fragments of download requests including a first fragment, a second fragment and a third fragment according to the check value.

Preferably, the method further includes: obtaining a check value of the file according to the attribute information about the file; and wherein, when the length of the file goes beyond a preset value, segmenting the download request into at least two fragments of download requests, includes:

when the length of the file goes beyond a preset value, segmenting the download request into at least two fragments of download requests according to the check value, wherein, the lengths of all the fragments obtained by segmenting the download request at least except the last fragment are equal to the check value. For example, when the length of the file goes beyond a preset value, the download request can be segmented into three fragments of download requests including a first fragment, a second fragment and a third fragment according to the check value.

Preferably, wherein the preset value is the check value.

Preferably, wherein, the step of sending the at least two fragments of download requests to at least two data nodes to request to download corresponding fragments, and obtaining the at least two fragments, includes:

sending the at least two fragments of download requests to the at least two data nodes to request to download the corresponding fragments; and receiving information returned by each data node, and if the information is a downloaded fragment, storing the downloaded fragment, sending other unprocessed fragments of download requests to the data nodes to request to download corresponding fragments, and obtaining the at least two fragments.

Furthermore, the method further includes:

if the information is download failure information, sending fragments of download requests which fail to download fragments to other data nodes except the data nodes which send the download failure information, to request to download corresponding fragments, and obtaining fragments downloaded from the other data nodes.

In an optional embodiment, after the step of receiving the information returned by each data node, the method further includes:

if the information is the downloaded fragment, recording information that the fragments are downloaded successfully from current data nodes; if the information is the download failure information, recording information that the fragments are unable to be downloaded from the current data nodes.

Embodiments of the present disclosure may have the following benefit effects: when the download request of the file is received, the attribute information about the file is acquired; according to the attribute information about the file, the download request is segmented into at least two fragments of download requests; the at least two fragments of download requests are sent to at least two data nodes to request to download corresponding fragments, therefore obtaining the at least two fragments; and according to the at least two fragments obtained by download, the file is obtained. By segmenting the download request into a plurality of fragments of requests, a parallel download of the plurality of fragments of requests is achieved, thereby greatly improving the download efficiency of a file.

A Second Embodiment

Figure 2:
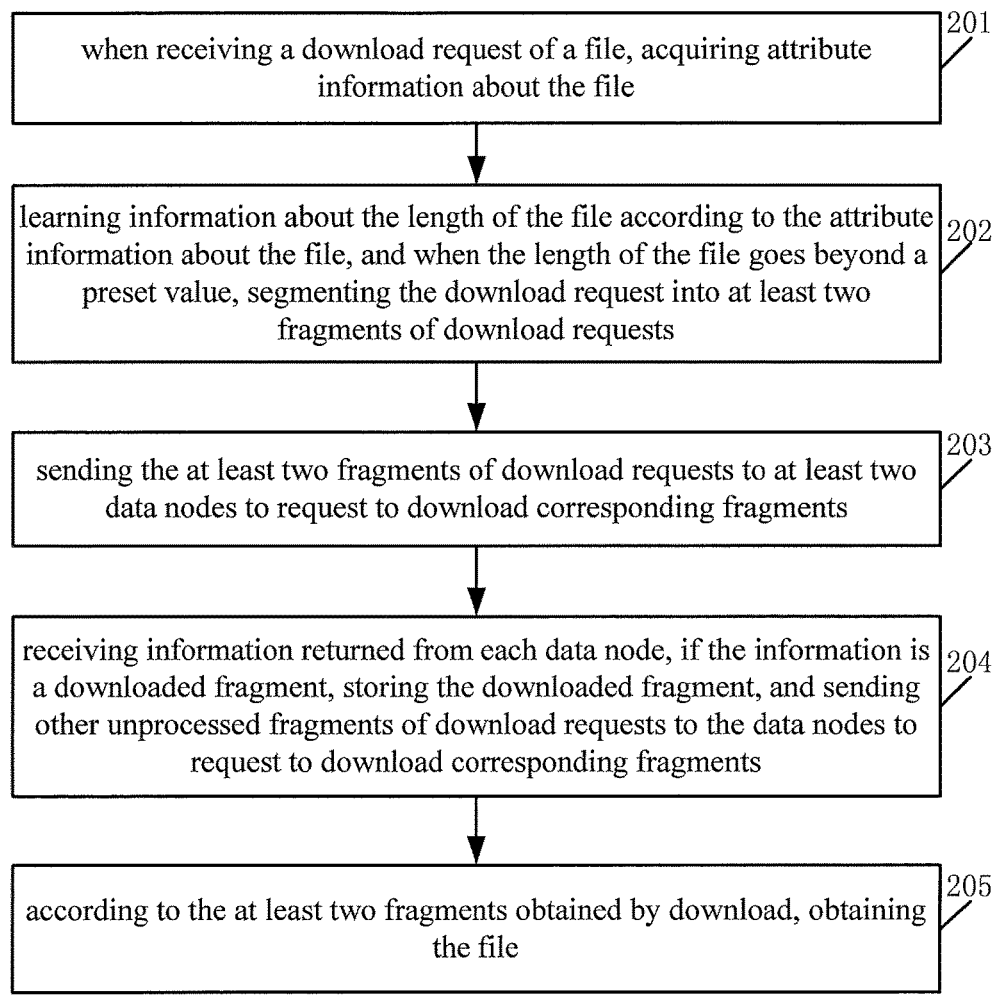
FIG. 2 is a flowchart of a method for downloading a file according to a second embodiment of the present disclosure.

Referring to FIG. 2, it is a flowchart of a method for downloading a file according to a second embodiment of the present disclosure, the method includes the following steps from Step 201.

Step 201: when receiving a download request of a file, acquiring attribute information about the file.

In one embodiment, when downloading a file, a HDFS (Hadoop Distributed File System) client firstly acquires the attribute information about the file, and the attribute information includes but not limited to: the length of the file, the number of blocks the file, the locations of all copies corresponding to each block, and check values of the file, etc., which is similar to the prior art, and will not be repeated here in embodiments of the present disclosure.

Step 202: learning information about the length of the file according to the attribute information about the file, and when the length of the file goes beyond a preset value, segmenting the download request into at least two fragments of download requests.

In one embodiment, when the length of the file goes beyond a preset value, the download request of the file can be segmented to obtain a plurality of fragments of download requests, so that the download for each block of the file can be converted to the download for smaller fragments, that is, the file can be downloaded by the way of downloading all the smaller fragments (for example, generally, the size of the block of the file is 64M, the size of the fragment is 128K). The preset value is the minimum size that is used to check the length of the file by the server. In detail, wherein, segmenting the download request into the at least two fragments of download requests includes: obtaining a check value of the file according to the attribute information about the file; segmenting the download request into at least two fragments of download requests according to the check value, wherein the length of at least one fragment among all the fragments obtained by segmenting the download request is equal to the check value. Due to the length of the file, the length of the last fragment may be less than the preset value, and except the last fragment, the length of other fragments is equal to the length of the preset value. In the embodiment, if the length of the file is less than the preset value, the file can be downloaded directly without requiring to segment the download request.

Besides, the step of segmenting the download request into at least two fragments of download requests can be realized by the following processing way: obtaining a check value of the file according to the attribute information about the file before performing the step. In detail, the process of the step may be: when the length of the file goes beyond the preset value, segmenting the download request into at least two fragments of download requests according to the check value, wherein the lengths of all the fragments at least except the last fragment are equal to the check value. For example, when the length of the file goes beyond a preset value, the download request can be segmented into three fragments of download requests including a first fragment, a second fragment and a third fragment according to the check value. Namely, the sizes of all the fragments except the last fragment of the file are equal to the check value, and the size of the last fragment of the file can be equal to or less than the check value, which is determined by actual length of the file and the size of the check value. Preferably, the preset value can be set as the check value.

In one embodiment, a segmentation method of the fragments is related to a way of storing data on the server. For example, a hash value can be figured out according to the data of every 128 k, to check the correctness of the data on the server, and the preset value is 128 k. The client can also segment the fragments according to the similar way to the segmentation method of the fragments of the server, and the file can be segmented into a plurality of fragments on an integer multiple of 128 k as a unit, that is, only when the size or length of the file exceeds the integer multiple of 128 k, then the file will be segmented, so that the server can reduce the workload for checking data. If the length of the file to be downloaded is less than 128 k, the file can be downloaded directly with no need to segmentation. And if the length of the file which requests to be downloaded is larger than 128 k, the download request can be segmented into at least two down requests corresponding to the fragments, to obtain at least two fragments. The length of each fragment is 128 k, and an end position of the first fragment is an integer multiple of 128 k, which can guarantee that all starting positions of subsequent fragments are in the place of an integer multiple of 128 k. For example, a block of the file has three copies, namely A, B and C, which are stored in different data nodes, namely A, B and C. When receiving a download request R for the block of the file, the request R can be segmented into n fragments, namely, s1, s2, s3, . . . sn, to obtain smaller downloading units.

Step 203: sending the at least two fragments of download requests to at least two data nodes to request to download corresponding fragments.

In one embodiment, a plurality of fragments of download requests can be sent to a plurality of data nodes, and each of the data nodes only receives part of the fragments of download requests. When receiving the fragments of download requests, the data nodes send corresponding fragments to the client.

In one embodiment, the fragments of download requests may be sent to a plurality of data nodes which store the copies corresponding to the fragments at a time, or, part of the fragments of download requests can be sent to the corresponding data nodes firstly, and when part of the fragments are downloaded successfully, then the other fragments of download requests can be sent to the corresponding data nodes. Understandably, it will not be restricted here in embodiments of the present invention.

Step 204: receiving information returned from each data node, if the information is a downloaded fragment, storing the downloaded fragment, and sending other unprocessed fragments of download requests to the data nodes to request to download corresponding fragments.

In an embodiment, preferably, part of fragments of download requests can be sent to corresponding data nodes according to locations of the copies contained in each block. When corresponding fragments returned from the data nodes are received, the other unprocessed fragments of download requests can be sent to the data nodes to continue to download corresponding fragments. For example, s1 is sent to A, s2 is sent to B, and s3 is sent to C; when s1 is downloaded successfully, then s4 is sent to A; when s2 is downloaded successfully, then s5 is sent to B, and so on, until all the fragments are downloaded successfully.

Since the loads of all the data nodes may not balance, so that the speed for processing the download requests by the data nodes are different. In the step S204, part of the fragments of download requests are sent to the corresponding data nodes, rather than send all the fragments of download requests to the data nodes, that is, When a response to the fragment of download request is received, a next fragment of download request is sent to the data node. Thus, idle data nodes can process more download requests, and busy data nodes can process fewer download requests, which may enable the overall flow of the cluster to be more balanced. Due to a balanced overall flow of the cluster, the download requests will not focus on one data node, thereby improving throughput capacity of the cluster.

In one embodiment, if the information is download failure information, sending fragment of download request which fails to download fragment to other data nodes except the data node which sends the download failure information, to request to download corresponding fragments, and obtaining fragments downloaded from the other data nodes. In detail, if one fragment is unable to be downloaded, the data node returns the download failure information, when the information received by the client is the download failure information, the client searches for the locations of the copies of each block, and finds the other data nodes which store copies of the blocks corresponding to the fragment, and sending the fragment of download request to the data nodes to continue to download the fragment.

In an optional embodiment, after the step of receiving the information returned by each data node, the method further includes: if the information is the downloaded fragment, recording information that the fragment is downloaded successfully from current data node; if the information is the download failure information, recording information that the fragment is unable to be download from the current data node. When the download failure information is received, the fragments of the file which fail to be downloaded can be sent to the data node which records the information that other fragments are downloaded successfully and stores the copy corresponding to the fragment, according to the information that the fragment is downloaded successfully or the download failure information from the data nodes. For example, fragment s1 is successfully downloaded from the data node A, fragment s2 fails to be download from the data node B, and fragment s3 is successfully downloaded from the data node C, then the information that the fragments s1 and s3 are successfully downloaded from data nodes A and C respectively is recorded, and the fragment s2 is sent to other data nodes to be downloaded, and the download failure information of the data node B is recorded. When the other fragments fail to be downloaded, the download requests corresponding to the other fragment are better sent to the data nodes which have downloaded the fragments successfully rather than be sent to the data node B, thereby further improving the download efficiency.

Wherein, the step 203 to the step 205 are the specific process of sending the at least two fragments of download requests to the at least two data nodes to request to download corresponding fragments, and obtaining the at least two fragments.

Step 205: according to the at least two fragments obtained by download, obtaining the file.

In one embodiment, when n fragments are downloaded successfully, then the n fragments can be pieced together in proper order to combine into a file corresponding to the download request R. Specific splicing process is similar to the prior art and can be found in the existing technology, which will not be repeated here in the embodiment.

Embodiment of the present disclosure may have the following benefit effects: when the download request of the file is received, the attribute information about the file is acquired; and information about the length of the file is learned according to the attribute information about the file; when the length of the file goes beyond a preset value, the download request is segmented into at least two fragments of download requests; the at least two fragments of download requests are sent to at least two data nodes to request to download corresponding fragments, therefore obtaining the at least two fragments; and according to the at least two fragments obtained by download, the file is obtained. By segmenting the download request into a plurality of fragments of requests, a parallel download of the plurality of fragments of requests is achieved, thereby greatly improving the download efficiency of a file. Meanwhile, the idle data nodes can process more download requests, and the busy data nodes can process fewer download requests, which can automatically balance network download traffic, but not allowing certain data nodes to become hot spots of the system, so that the load of the entire cluster is more balanced, and the throughput capacity of the cluster is improved.

A Third Embodiment

Figure 3:
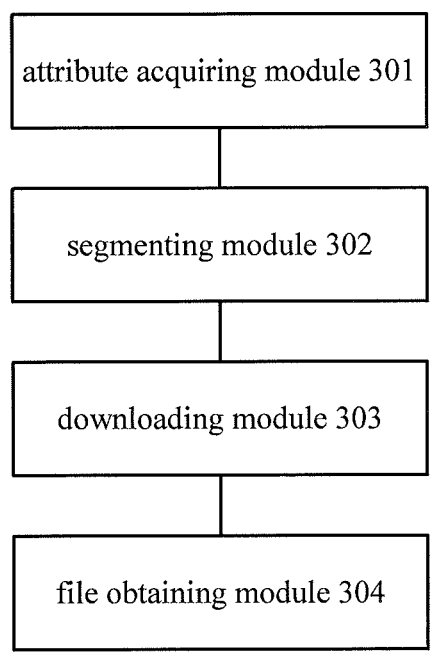
FIG. 3 is a structure diagram of a device for downloading a file according to a third embodiment of the present disclosure.

Referring to FIG. 3, it is a structure diagram of a device for downloading a file according to a third embodiment of the present disclosure, which is based on the same technical concept of the method for downloading a file. The device includes an attribute acquiring module 301, a segmenting module 302, a downloading module 303 and a file obtaining module 304. Wherein, the attribute acquiring module 301, is configured to acquire attribute information about a file, when receiving a download request of the file, and learn information about the length of the file according to the attribute information about the file;

the segmenting module 302, is configured to segment the download request into at least two fragments of download requests when the length of the file goes beyond a preset value;

the downloading module 303, is configured to send the at least two fragments of download requests to at least two data nodes to request to download corresponding fragments, and obtain the at least two fragments; and the file obtaining module 304, is configured to obtain the file according to the at least two fragments obtained by download.

Figure 4:
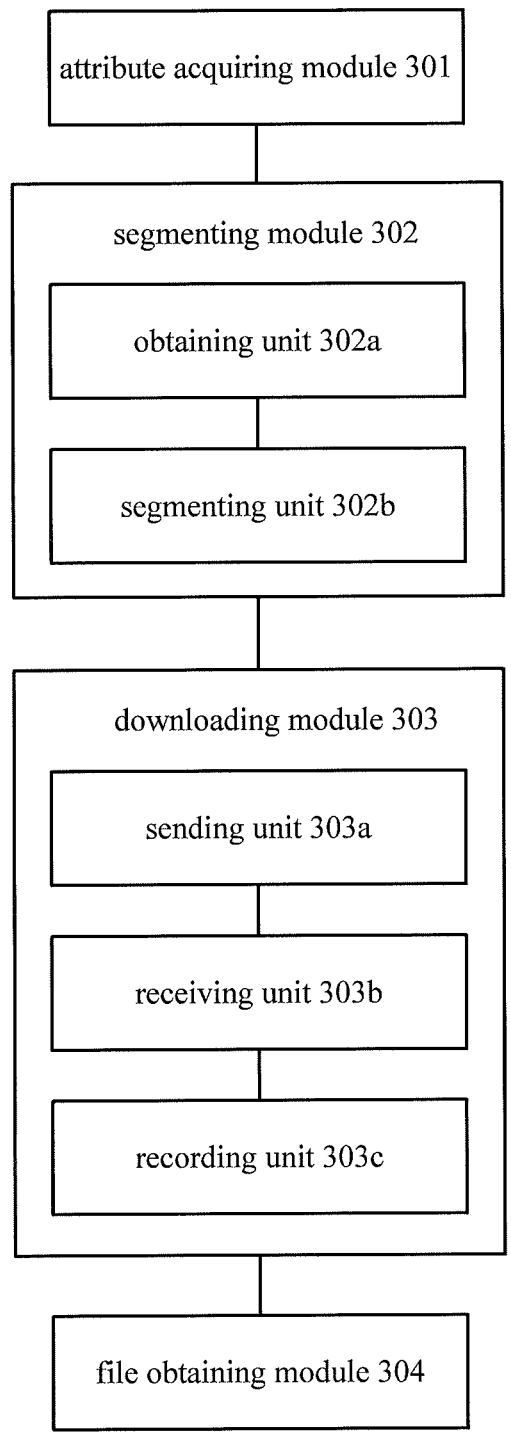
FIG. 4 is a structure diagram of a device for downloading a file according to the third embodiment of the present disclosure.

Preferably, referring to FIG. 4, it is another structure diagram of a device for downloading a file according to a third embodiment of the present disclosure. Wherein the segmenting module 302 includes:

an obtaining unit 302a, is configured to obtain a check value of the file according to the attribute information about the file; and a segmenting unit 302b, is configured to segment the download request into at least two fragments of download requests according to the check value, wherein, the length of at least one fragment among all the fragments obtained by segmenting the download request is equal to the check value. For example, when the length of the file goes beyond a preset value, the download request can be segmented into three fragments of download requests including a first fragment, a second fragment and a third fragment according to the check value.

Preferably, wherein the attribute acquiring module 301 is further configured to obtain a check value of the file according to the attribute information about the file; and wherein the segmenting module 302 is configured to when the length of the file goes beyond a preset value, segment the download request into at least two fragments of download requests according to the check value, wherein the lengths of all the fragments obtained by segmenting the download request at least except the last fragment are equal to the check value. For example, when the length of the file goes beyond a preset value, the download request can be segmented into three fragments of download requests including a first fragment, a second fragment and a third fragment according to the check value.

Preferably, the preset value is the check value.

Preferably, referring to FIG. 4, wherein the downloading module 303 includes: a sending unit 303a and a receiving unit 303b.

The sending unit 303a, is configured to send the at least two fragments of download requests to at least two data nodes to request to download corresponding fragments; and the receiving unit 303b, is configured to receive information returned by each data node, and if the information is a downloaded fragment, store the downloaded fragment, send other unprocessed fragments of download requests to the data nodes to request to download corresponding fragments, and obtain the at least two fragments.

Wherein the receiving unit 303b is further configured to if the information is download failure information, send fragments of download request which fail to download fragments to other data nodes except the data node which send the download failure information, to request to download corresponding fragments, and obtain fragments downloaded from the other data nodes.

In an optional embodiment, referring to FIG. 4, wherein the downloading module 303 further includes: a recording unit 303c.

The recording unit 303c, is configured to record information that the fragments are downloaded successfully from current data node after the receiving unit 303b receiving the information returned by each data node and if the information is a downloaded fragment, and if the information is download failure information, record information that the fragments are unable to be downloaded from the current data node.

Embodiment of the present disclosure may have the following benefit effects: when the download request of the file is received, the attribute information about the file is acquired; and information about the length of the file is learned according to the attribute information about the file; when the length of the file goes beyond a preset value, the download request is segmented into at least two fragments of download requests; the at least two fragments of download requests are sent to at least two data nodes to request to download corresponding fragments, therefore obtaining the at least two fragments; and according to the at least two fragments obtained by download, the file is obtained. By segmenting the download request into a plurality of fragments of requests, a parallel download of the plurality of fragments of requests is achieved, thereby greatly improving the download efficiency of a file.

A Fourth Embodiment

Figure 5:
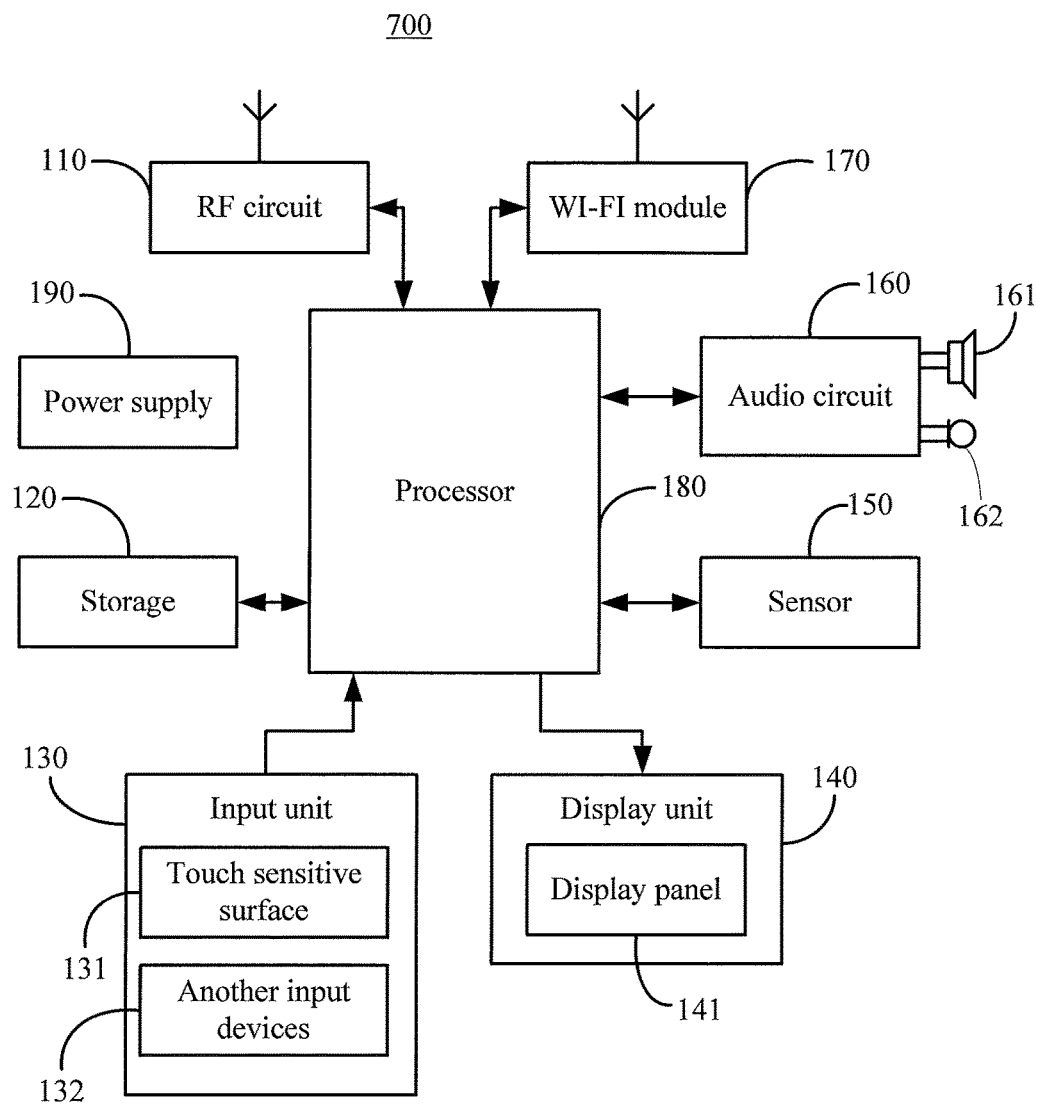
FIG. 5 is a structure diagram of a terminal according to a fourth embodiment of the present disclosure.

Referring to FIG. 5, it is a structure diagram of a terminal according to a fourth embodiment of the present disclosure.

The terminal 700 can be used to implement the method for downloading a file provided in the above-described embodiments. Specifically, the terminal 700 further includes: a radio frequency (RF) circuit 110, one or more than one storage 120 with computer readable storage medium, an input unit 130, a display unit 140, a sensor 150, an audio circuit 160, a wireless fidelity (WI-FI) module 170, one or more than one processors 180, and a power supply 190. Person having ordinary skill in the art can understand that the structure of the terminal shown in the FIG. 5 cannot be a limitation to a terminal. That is, the terminal may includes more or fewer elements than that as shown in the FIG. 5, or combinations of the elements shown in the FIG. 5, or other element arrangements which are different from the element arrangements shown in the FIG. 5.

The RF circuit 110 is used to receive and send information, or receive and send signals during a communication. Specially, the RF circuit 110 receives downlink information from a base station, and then sends the downlink information to one or more than one processor 180 to be processed. In addition, the RF circuit 110 also sends uplink data corresponding to the downlink information to the base station. Generally, the RF circuit 110 includes but not limited to: an antenna, at least one amplifier, a tuner, one or more than one oscillator, a subscriber identity module (SIM) card, a transceiver, a coupler, a low noise amplifier (LNA), and a duplexer. In addition, the RF circuit 100 may communicate with network and other devices in form of wireless communication. The wireless communication may use any communication standard or communication protocol, such as a global system of mobile communication (GSM), a general packet radio service (GPRS), a code division multiple access (CDMA), a wideband code division multiple access (WCDMA), long term evolution (LTE), an email, a short messaging service (SMS), etc.

The storage 120 may be used to store software programs and modules, such as the program instructions and modules corresponding to the browser of the above-mentioned embodiments, and store data which is generated during the process of browsing the web page under the weak light by the mobile terminal browser in the embodiment. The processor 180 can run the software programs and the modules stored in the storage 120 to execute the corresponding function applications and process the corresponding data, thus realizing the function of browsing the web page under the weak light with the mobile terminal browser. The storage 120 may mainly include a program storage area and a data storage area. The program storage area can store an operation system, at least one application program corresponding to one function (such as, a sound play function, an image play function, and so on). The data storage area can store data (such as audio data, phone book, and so on) created by the use of the terminal 700. In addition, the storage 120 may include a high-speed random access memory and a nonvolatile memory, such as at least one disk storage device, flash memory device, or other volatile solid state memory device. Correspondingly, the storage 120 may further include a memory controller, to control the processor 180 and the input unit 130 to access the storage 120.

The input unit 130 may be used to receive input number or character information, and also used to be as a keyboard, a mouse, an operation rob, an optical input device or a trackball signal input device to conduct the user setup or function control. In detail, the input terminal 130 may include a touch sensitive surface 131 and an input device 132. The touch sensitive surface 131 may be defined as a touch screen panel or a touchpad, which is used to receive an instruction generated by a touch operation on or around the touch sensitive surface 131, and drives a connection device corresponding to the instruction according to a predetermined program. The touch operation may be an operation of an object (such as a figure or a stylus) moving on or around the touch sensitive surface 131. Preferably, the touch sensitive surface 131 may include a touch detection device and a touch controller. The touch detection device detects a location of the user touching the touch sensitive surface 131, and detects a signal generated by touch operation, and transmits the signal to the touch controller. The touch controller receives the signal from the touch detection device, and converts the signal into a coordinate, and transmits the coordinate to the processor 180. The touch controller can receive an instruction from the processor 180 and execute the instruction. In addition, the touch sensitive surface 131 may be a resistive touch screen panel or touchpad, a capacitive touch screen panel or touchpad, an infrared touch screen panel or touchpad, a surface acoustic wave touch screen panel or touchpad, or other types touch screen panels or touch pads. The input unit 130 further includes other input devices 132. The other input devices 132 may include but not be limited to one or more of a physical keyboard, function keys (such as a volume key for controlling the volume of the terminal, a switch key, and so on), a trackball, a mouse, an operation rob, and so on.

The display unit 140 may be used to display information input by the user or supplied to the user, and display all kinds of graphical user interfaces (GUIs) of the terminal 700. The GUIs may consist of graphs, texts, icons, videos, and any combination of the graphs, the texts, the icons, and the videos. The display unit 140 may include a display panel 141. The display panel 141 may be the liquid crystal display (LCD) panel or the organic light-emitting diode panel. Further, the touch sensitive surface 131 can cover the display panel 141. When the touch sensitive surface 131 detects the touch operation on or around the touch sensitive surface 131, the touch sensitive surface 131 transmits the instruction corresponding to the touch operation to the processor 180, to make the processor 180 determine a type of the touch operation. After the processor 180 determines the type of the touch operation, the processor 180 displays the determined type of the touch operation on the display panel 141. Although the touch sensitive surface 131 and the display panel 141 are two independent elements to respectively realize the input function and the output function in FIG. 5, in some embodiments, the touch sensitive surface 131 is integrated with the display panel 141 to realize the input function and the output function.

The terminal 700 further may include at least one sensor 150, such as a light sensor, a motion sensor, and other sensors. In detail, the light sensor may include an ambient light sensor and a proximity sensor. The ambient light sensor can adjust the brightness of the display panel 141 according to the ambient light. The proximity sensor can turn off the display panel 141 and/or backlight when the terminal 700 moves to the ear of the user. As one of the motion sensors, a gravity sensor can detect accelerations from every direction (generally the directions of three axles), and detect the gravity and a direction of the gravity. The gravity sensor also can determine special applications of a mobile phone (such as a switch from a landscape mode of the mobile phone to a portrait mode, games related to the pose of the mobile phone, a magnetometer pose calibration), and detects functions related to vibration (such as pedometer, knock). The terminal 700 also has a gyroscope, a barometer, a hygrometer, a hygrometer, a thermometer, an infrared sensor, and so on.

Each of an audio circuit 160, a loudspeaker 161, and a microphone 162 has an audio interface to be supplied for the user. The audio circuit 160 may receive audio data and converts the audio data into an electrical signal, and transmit the electrical signal to the loudspeaker 160. The loudspeaker 160 converts the electrical signal into a sound signal, and outputs the sound signal. In addition, the loudspeaker 162 can receive a sound signal, converts the sound signal into an electrical signal, and outputs the electrical signal to the audio circuit 160. The audio circuit 160 receives the electrical signal, converts the electrical signal into an audio signal, and outputs the audio signal to the processor 180. The processor 180 processes the audio signal and outputs the processed audio signal to another terminal by RF circuit 110, or stores the processed audio signal in the storage 120. The audio circuit 160 may include a headphone jack, to connect to an external headphone to make the external headphone communicate with the terminal 700.

The WI-FI belongs to a short-range wireless communication technology. The terminal 700 can help the user to receive or send email, and browse the web pages and access to the streaming media through an input/output interface of the WI-FI module. The terminal 700 provides the wireless network to make the user can access the internet. Although there is the WI-FI module 170 in FIG. 5, it can be understood that the terminal 700 may not include the WI-FI module 170. That is, the WI-FI module 170 of the terminal 700 can be omitted according to need.

The processor 180 is a control center of the terminal 700, and is connected to every portion of the mobile phone through all kinds of interfaces and cables. The processor 180 executes various functions and processes data of the terminal 700 to monitor the mobile phone through running or executing the software programs and/or modules stored in the storage 120, or through invoking data stored in the storage 120. The processor 180 may include one processing core or more processing cores. Preferably, an application processor and a modem processor can be integrated into the processor 180. The application processor mainly processes the operation system, the user interface, application programs, and so on. The modem processor mainly processes the wireless communication. It can be understood that, the modem processor may not be integrated into the processor 180.

The terminal 700 further includes a power supply 190 such as a battery for powering other elements of the terminal 700. Preferably, the power supply 1900 is connected to the processor 180 through a power management system. The power management system is used to charge or discharge the power supply 190, and manages the power of the power supply 190, and so on. The power supply 190 may includes any combination of one or more than one direct current (DC) power or alternative current (AC) power, rechargeable battery system, fault detection circuit, converter, or inverter, power state indicator.

The terminal 700 further may include a camera, a Bluetooth module, and so on. The camera and the Bluetooth module are not shown. Specifically, in one embodiment, the display unit of the terminal 700 can be a touch screen monitor. The terminal 700 may further include a storage, and one or more programs, the one or more programs stored in the storage for execution by one or more processors, the one or more programs including instructions for performing the following steps:

when receiving a download request of a file, acquiring attribute information about the file, and learning information about the length of the file according to the attribute information about the file;

when the length of the file goes beyond a preset value, segmenting the download request into at least two fragments of download requests;

sending the at least two fragments of download requests to at least two data nodes to request to download corresponding fragments, and obtaining the at least two fragments; and according to the at least two fragments obtained by download, obtaining the file.

Preferably, wherein segmenting the download request into at least two fragments of download requests, includes:

obtaining a check value of the file according to the attribute information about the file; and segmenting the download request into at least two fragments of download requests according to the check value, wherein, the length of at least one fragment among all the fragments obtained by segmenting the download request is equal to the check value. For example, when the length of the file goes beyond a preset value, the download request can be segmented into three fragments of download requests including a first fragment, a second fragment and a third fragment according to the check value.

Preferably, the method further including: obtaining a check value of the file according to the attribute information about the file; and wherein, when the length of the file goes beyond a preset value, segmenting the download request into at least two fragments of download requests, includes:

when the length of the file goes beyond a preset value, segmenting the download request into at least two fragments of download requests according to the check value, wherein the lengths of all the fragments obtained by segmenting the download request at least except the last fragment are equal to the check value.

Preferably, wherein the preset value is the check value. For example, when the length of the file goes beyond a preset value, the download request can be segmented into three fragments of download requests including a first fragment, a second fragment and a third fragment according to the check value.

Preferably, wherein sending the at least two fragments of download requests to at least two data nodes to request to download corresponding fragments, and obtaining the at least two fragments, includes:

sending the at least two fragments of download requests to at least two data nodes to request to download corresponding fragments; and receiving information returned by each data node, and if the information is a downloaded fragment, storing the downloaded fragment, sending other unprocessed fragments of download requests to the data node to request to download corresponding fragments, and obtaining the at least two fragments.

Preferably, the method further including:

if the information is download failure information, sending fragments of download request which fail to download fragments to other data nodes except the data node which send the download failure information, to request to download corresponding fragments, and obtaining fragments downloaded from the other data nodes.

Preferably, after receiving information returned by each data node, the method further including:

if the information is a downloaded fragment, recording information that the fragments are downloaded successfully from current data node, and if the information is download failure information, recording information that the fragments are unable to be downloaded from the current data node.

Embodiments of the present disclosure may have the following benefit effects: when the download request of the file is received, the attribute information about the file is acquired; according to the attribute information about the file, the download request is segmented into at least two fragments of download requests; the at least two fragments of download requests are sent to at least two data nodes to request to download corresponding fragments, therefore obtaining the at least two fragments; and according to the at least two fragments obtained by download, the file is obtained. By segmenting the download request into a plurality of fragments of requests, a parallel download of the plurality of fragments of requests is achieved, thereby greatly improving the download efficiency of a file.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The foregoing descriptions are merely exemplary embodiments of the present disclosure, but not intended to limit the protection scope of the present invention. Any variation or replacement made by persons of ordinary skills in the art without departing from the spirit of the present invention shall fall within the protection scope of the present invention. Therefore, the scope of the present invention shall be subject to be appended claims.

What is claimed is:

1. A method for downloading a file to a device, the method comprising:
   when receiving a download request a file,
     acquiring, by the device, attribute information about the file from a name node of at least two data nodes,
     learning information, by the device, about the length of the file according to the attribute information about the file, and
     when the length of the file goes beyond a preset value,
       segmenting, by the device, the download request into at least two fragments of download requests, the at least two fragments of download requests comprising a first fragment download request and a second fragment download request,
       sending the at least two fragments of download requests from the device to the at least two data nodes to request to download corresponding fragments,
       receiving, by the device, information returned by each data node, and
       identifying, by the device, whether the information is a downloaded fragment or download failure information,
       wherein, when the downloaded information corresponding to the first fragment download request that is received from one data node is identified as the download failure information,
         excluding, by the device, the data node from the at least two data nodes; and
       when the downloaded information corresponding to the second fragment download request is also identified as the download failure information, sending, by the device, the second fragment download request to another data node of the at least two data nodes;
     wherein, when the downloaded information corresponding to the first fragment download request that is received from one data node is identified as the downloaded fragment and the downloaded information corresponding to the second fragment download request is identified as the download failure information, sending, by the device, the second fragment download request to the data node; and
     wherein, when downloaded fragments corresponding to fragments of download requests are received from data nodes, obtaining, by the device, the file according to the at least two fragments obtained by download.

2. The method according to claim 1, wherein, the step of segmenting the download request into at least two fragments of download requests, comprises:
   obtaining a check value of the file according to the attribute information about the tile; and
   segmenting the download request into at least two fragments of download requests according to the check value, wherein, the length of at least one fragment among all the fragments obtained by segmenting the download request is equal to the check value.

3. The method according to claim 1, the method further comprising:
   obtaining a check value of the file according to the attribute information about the file; and
   wherein, when the length of the file goes beyond a preset value, segmenting the download request into at least two fragments of download requests, comprises:
   when the length of the file goes beyond a preset value, segmenting the download request into at least two fragments of download requests according to the check value, wherein the lengths of all the fragments obtained by segmenting the download request at least except the last fragment are equal to the check value.

4. The method according to claim 3, wherein the preset value is the check value.

5. The method according to claim 1, wherein, when the downloaded information of the download request that is received from one data node is identified as the downloaded fragment, storing the downloaded fragment.

6. The method according to claim 5, the method further comprising:
   if the information is identified as the download failure information, sending fragments of download request which fail to download fragments to other data nodes except the data node which send the download failure information, to request to download corresponding fragments, and obtaining fragments downloaded from the other data nodes.

7. The method according to claim 5, after the step of receiving information returned by each data node, the method further comprising:
   if the information is identified as the downloaded fragment, recording information that the fragments are downloaded successfully from current data node; and if the information is identified as the download failure information, recording information that the fragments are unable to be downloaded from the current data node,
wherein the sending the other unprocessed fragments of download requests to the data node to request to download the corresponding fragments is based on the recorded information.

8. A device for downloading a file, comprising:
a processor;
a memory storing a plurality of instructions, the plurality of instructions being executed by the processor and causing the processor to:
acquire attribute information about a file from a name node of at least two data nodes when receiving a download request of the file;
learn information about the length of the file according to the attribute information about the file;
download the file directly when the length of the file is less than or equal to a preset value; and
when the length of the file goes beyond the preset value,
segment the download request into at least two fragments of download requests, the at least two fragments of download requests comprising a first fragment download request and a second fragment download request;
send the at least two fragments of download requests to the at least two data nodes to request to download corresponding fragments,
receive information returned by each data node; and
identify whether the information is a downloaded fragment or download failure information,
wherein, when the downloaded information corresponding to the first fragment download request that is received from one data node is identified as the download failure information,
exclude the data node from the at least two data nodes; and
when the downloaded information corresponding to the second fragment download request is also identified as the download failure information, send the second fragment download request to another data node of the at least two data nodes;
wherein, when the downloaded information corresponding to the first fragment download request that is received from one data node is identified as the downloaded fragment and the downloaded information corresponding to the second fragment download request is identified as the download failure information,
send the second fragment download request to the data node; and
wherein, when downloaded fragments corresponding to fragments of download requests are received from data nodes,
obtain the file according to the at least two fragments obtained by download.

9. The device according to claim 8, wherein, to segment the download request into at least two fragments of download requests according to a check value, the plurality of instructions further causing the processor to:
obtain the check value of the file according to the attribute information about the file; and
segment the download request into at least two fragments of download requests according to the check value, wherein, the length of at least one fragment among all the fragments obtained by segmenting the download request is equal to the check value.

10. The device according to claim 8, wherein the plurality of instructions further causing the processor to:
when the length of the file goes beyond a preset value,
obtain a check value of the file according to the attribute information about the file; and
segment the download request into at least two fragments of download requests according to the check value, wherein the lengths of all the fragments obtained by segmenting the download request at least except the last fragment are equal to the check value.

11. The device according to claim 10, wherein the preset value is the check value.

12. The device according to claim 8, wherein, when the downloaded information of the download request that is received from one data node is identified as the downloaded fragment, store the downloaded fragment.

13. The device according of claim 12, wherein the plurality of instructions further causing the processor to:
if the information is identified as the download failure information, send fragments of download request which fail to download fragments to other data nodes except the data node which sent the download failure information, to request to download corresponding fragments,
and obtain fragments downloaded from the other data nodes.

14. The device according to claim 12, wherein the plurality of instructions further causing the processor to:
record information that the fragments are downloaded successfully from current data node after receiving the information returned by each data node and if the information is identified as the downloaded fragment, and if the information is identified as the download failure information, record information that the fragments are unable to be downloaded from the current data node,
wherein the other unprocessed fragments of download requests are sent to the data node to request to download the corresponding fragments based on the recorded information.

15. The method according to claim 6, after the step of receiving information returned by each data node, the method further comprising:
if the information is identified as the downloaded fragment, recording information that the fragments are downloaded successfully from current data node; and
if the information is identified as the download failure information, recording information that the fragments are unable to be downloaded from the current data node,
wherein the sending the other unprocessed fragments of download requests to the data node to request to download the corresponding fragments is based on the recorded information.

16. The device according to claim 13, wherein the plurality of instructions further causing the processor to:
record information that the fragments are downloaded successfully from current data node after receiving the information returned by each data node and if the information is identified as the downloaded fragment, and if the information is identified as the download failure information, record information that the fragments are unable to be downloaded from the current data node, wherein the other unprocessed fragments of download requests are sent to the data node to request to download the corresponding fragments based on the recorded information.

17. A non-transitory computer readable storage medium, storing one or more programs for execution by one or more processors of a computer having a display, the one or more programs comprising instructions for performing:
when receiving a download request of a file,
acquiring, by the computer, attribute information about the file from a name node of at least two data nodes,
learning information, by the computer, about the length of the file awarding to the attribute information about the file, and
when the length of the file goes beyond a preset value,
segmenting, by the computer, the download request into at least two fragments of download requests, the at least two fragments of download requests comprising a first fragment download request and a second fragment download request,
sending the at least two fragments of download requests from the computer to the at least two data nodes to request to download corresponding fragments,
receiving, by the computer, information returned by each data node, and
identifying, by the computer, whether the information is a downloaded fragment or download failure information,
wherein, when the downloaded information corresponding to the first fragment download request that is received from one data node is identified as the download failure information,
excluding, by the computer, the data node from the at least two data nodes; and
when the downloaded information corresponding to the second fragment download request is also identified as the download failure information, sending, by the computer, the second fragment download request to another data node of the at least two data nodes;
wherein, when the downloaded information corresponding to the first fragment download request that is received from one data node is identified as the downloaded fragment and the downloaded information corresponding to the second fragment download request is identified as the download failure information,
sending, by the computer, the second fragment download request to the data node; and
wherein, when downloaded fragment fragments corresponding to fragments of download requests are received from data nodes,
obtaining, by the computer, the file according to the at least two fragments obtained by download.

18. The non-transitory computer readable storage medium according to claim 17, wherein, the step of segmenting the download request into at least two fragments of download requests, comprises:
obtaining a check value of the tile according to the attribute information about the file; and
segmenting the download request into at least two fragments of download requests according to the check value, wherein, the length of at least one fragment among all the fragments obtained by segmenting the download request is equal to the check value.

19. The non-transitory computer readable storage medium according to claim 17, further comprising: obtaining a check value of the file according to the attribute information about the file; and
wherein, when the length of the file goes beyond a preset value, segmenting the download request into at least two fragments of download requests, comprises:
when the length of the file goes beyond a preset value, segmenting the download request into at least two fragments of download requests according to the check value,
wherein the lengths of all the fragments obtained by segmenting the download request at least except the last fragment are equal to the check value.

20. The non-transitory computer readable storage medium according to claim 17, wherein, the step of sending the at least two fragments of download requests to the at least two data nodes to request to download corresponding fragments, and obtaining the at least two fragments, comprises:
sending the at least two fragments of download requests to the at least two data nodes to request to download corresponding fragments; and
receiving information returned by each data node, and if the information is a downloaded fragment, storing the downloaded fragment, sending other unprocessed fragments of down load requests to the data node to request to download corresponding fragments, and obtaining the at least two fragments.

* * * * *